United States Patent [19]

Broger et al.

[11] 4,174,466

[45] Nov. 13, 1979

[54] MULTI-PARTY TELEPHONE SYSTEM ALLOWING SPEECH CONNECTION BETWEEN EXTENSIONS AS BETWEEN EXTENSIONS AND AN OUTER LINE

[75] Inventors: Lars I. Broger, Nynashämn; Sten E. Magnusson, Tyresö, both of Sweden

[73] Assignee: Telefonaktiebolaget L M Ericsson, Stockholm, Sweden

[21] Appl. No.: 825,182

[22] Filed: Aug. 17, 1977

[30] Foreign Application Priority Data

Sep. 1, 1976 [SE] Sweden ................................ 7609646

[51] Int. Cl.² .............................................. H04Q 1/30
[52] U.S. Cl. ................. 179/18 AD; 179/18 J
[58] Field of Search ........................ 179/37, 38, 39, 40, 179/99, 18 AD, 15 AT, 15 BY, 18 J

[56] References Cited

U.S. PATENT DOCUMENTS

| | | | |
|---|---|---|---|
| 3,701,854 | 10/1972 | Anderson et al. | 179/18 AD |
| 3,843,845 | 10/1974 | Ridley | 179/99 |
| 3,935,396 | 1/1976 | Barsellotti et al. | 179/99 |
| 3,941,936 | 3/1976 | Graham et al. | 179/15 AT |
| 3,997,738 | 12/1976 | Korsky et al. | 179/99 |

*Primary Examiner*—Thomas W. Brown
*Attorney, Agent, or Firm*—Hane, Roberts, Spiecens & Cohen

[57] ABSTRACT

A multy-party telephone system for the connection of telephone sets by a small number of wires has arrangements for achieving the exchange of information by digital signalling between the telephone sets and a control unit included in a exchange unit of the system. The system includes a number of telephone sets each connected through a 6-wire line to a exchange unit common for all the telephones. Four of the wires in the 6-wire line constitute two signalling channels, one channel for each direction between the telephone and the exchange unit. The remaining two wires in the 6-wire line are used as speech wires. Each of the telephone sets includes a code sender for signalling with digital code words to the exchange unit, a code receiver for receiving digital signalling code words from the exchange unit, a tone ringer for producing audio signals when receiving a call, lamp indicators for indicating the system status and a push button set for initiating those functions which can be carried out by the telephone set. The exchange unit includes a code receiver common for all telephone sets for receiving the code words sent from each of the telephone sets, a code sender common for all telephone sets for transmitting calculated code words to the telephone sets, a control unit for common signal processing and for setting up the speech paths of the telephone sets through a switch, and a signal converter for the conversion of signals from the system to an external line and vice versa.

3 Claims, 6 Drawing Figures

4,174,466

MULTI-PARTY TELEPHONE SYSTEM ALLOWING SPEECH CONNECTION BETWEEN EXTENSIONS AS BETWEEN EXTENSIONS AND AN OUTER LINE

BACKGROUND OF THE INVENTION

The invention relates to a multy-party telephone system for connecting, by a small number of wires, telephone sets included in the system to at least one external line and to each other respectively, all with signalling between the telephone sets and an exchange unit being carried out by digital signal words.

In the market there is a great demand for telephone systems in which telephone sets are included for connection to external lines and with internal connection possibilities to each other. These systems can either be connected as sub systems to a local exchange or be executed as separate plants the output lines of which then are connected to a local exchange. Characterizing for these systems are that they as a rule are traffic intensive and have a relatively large number of coupling services which can easily and quickly be connected with for example buttons on the telephone set. Furthermore, it is important in these systems to have an effective carry and attendance service function.

In earlier known solutions a great number of wire pairs are usually required in the internal network of the system. Certain tests have been made to eliminate the number of wire pairs for example as shown in Swedish Patent application No. 7503102-1. However, in the arrangement according to that application there is an inconvenience in that separate signal generators have to be used for internal signalling between connected telephone sets and when signalling towards external lines.

In order to obtain safe trunk discrimination control when utilizing a separate generator for the external selection signalling this signal must be repeated in the central unit of the system. Furthermore, on internal call no call secrecy is obtained when all the calls are exchanged through a common line.

The invention which solves said problem is characterized in the appended claims.

DESCRIPTION OF THE DRAWINGS

The invention is described more in detail by means of an embodiment with reference to the accompanying drawings, wherein.

DESCRIPTION OF THE PREFERRED EMBODIMENT

Figure 1:
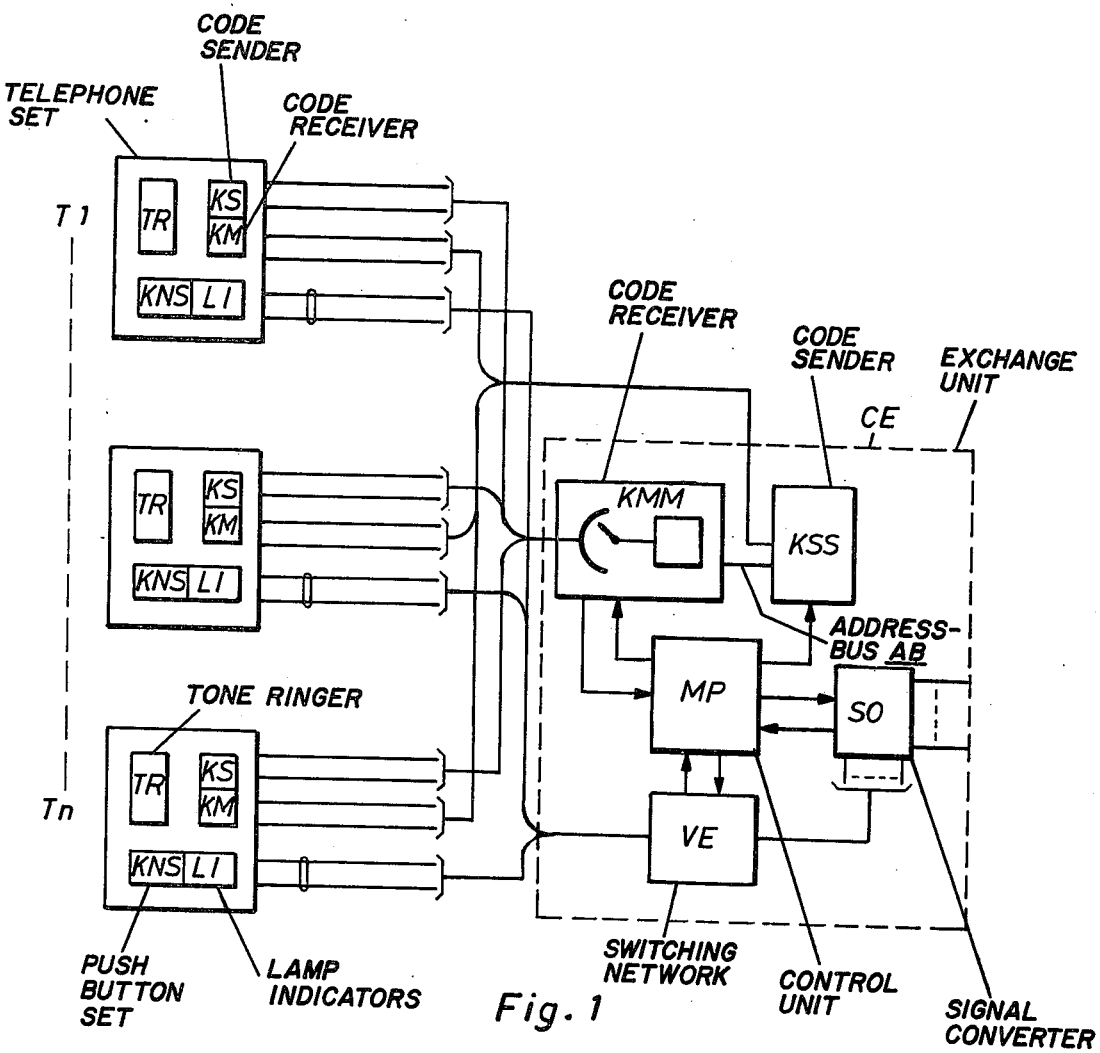
FIG. 1 is a block diagram of the whole system.

As appears from FIG. 1 the system is built up of a number of telephone sets T1-Tn said of which is connected through a 6-wire line network to an exchange unit CE common for all the sets.

Four of the wires in the 6-wire line constitute two signalling channels, one channel for each direction between the telephone and the exchange unit. The remaining two wires in the 6-wire line are used as speech wires.

Each of the telephone sets includes a code sender KS for signalling with digital code words to the exchange unit, a code receiver KM for receiving digital signalling code words from the central unit, a tone ringer TR for producing audio signals when receiving a call, lamp indicators LI for indicating the system status and a push button set KNS for initiating those functions which can be carried out by the telephone set in question. (For example inquiry to another set, transfer of calls and so on.)

The exchange unit CE includes a code receiver KMM common for all telephone sets for receiving the signalling code words sent from each of the telephones, a code sender KSS common for all telephone sets for transmitting calculated activating code words to the telephone sets in response to the received signals, a control unit MP for common signal treatment which is constituted by a control computer which in a manner known per se also controls the setting up of the speech paths of the telephone sets through a switch VE. Furthermore, the exchange unit CE includes a signal converter SO for converting the code words coming from the telephones into signals which can be received by a public station and for converting external ringing signals into digital code words for signalling within the system.

Figure 2:
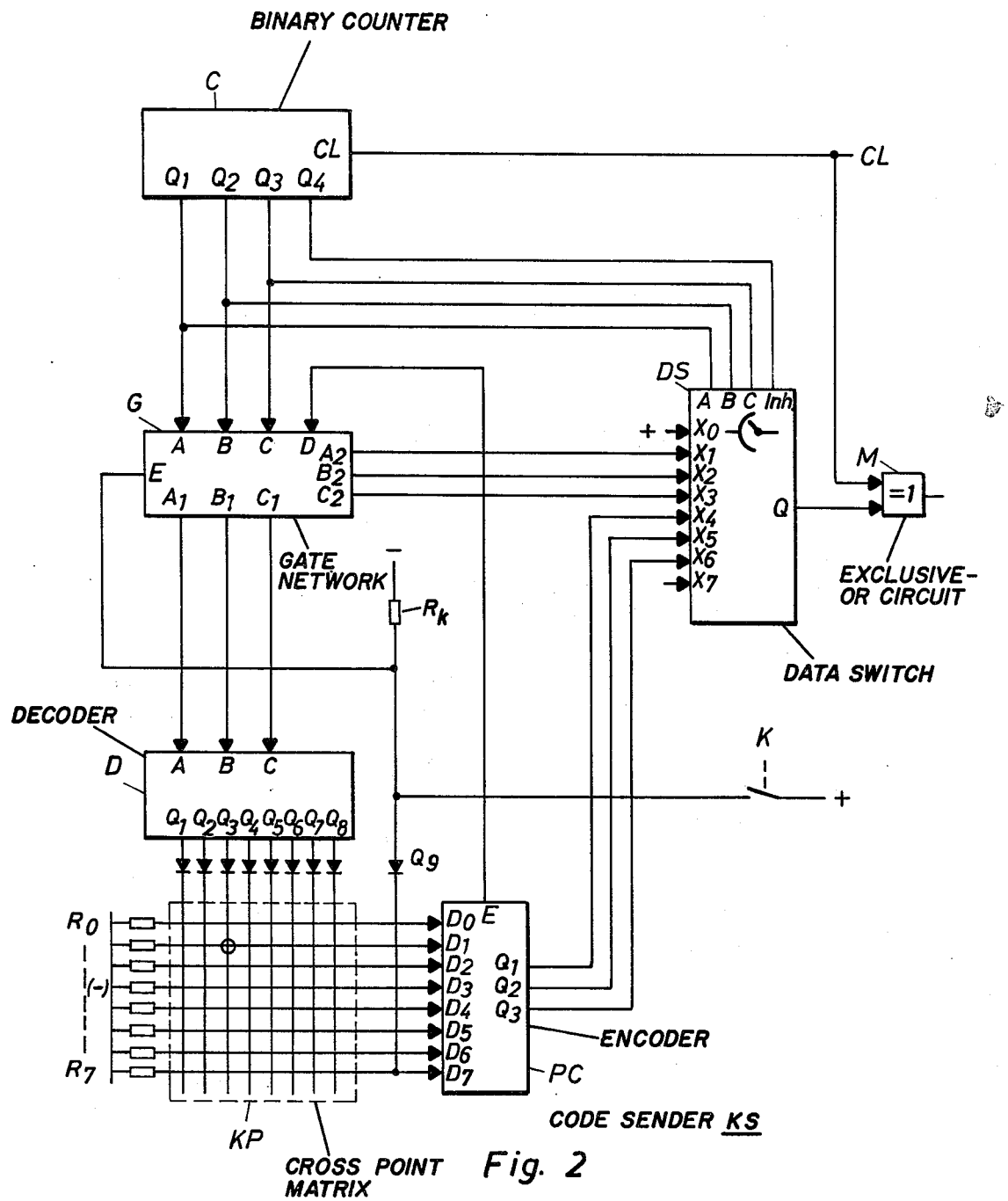
FIG. 2 is a block diagram of a code sender included in each of the telephone sets.

FIG. 2 shows a block diagram of the code sender KS arranged in each telephone set the task of which is to transmit signalling code words in dependence on the hook state and the push button state. Each signalling code word consists of 8 zeros, one logical one for synchronization and 7 information bits, i.e. 16 bits (000000001XXXXXXX).

For encoding the push button state and the hook state a matrix KP with 64 cross points is used. Each cross point corresponds to a push button state or to a hook state. A 1 of 8-decoder D, connected to the cross point matrix KP, is addressed at its inputs A, B, C by a continuously working 4-bits binary counter C via a gate network G. The outputs Qq1-q8 of the decoder D are connected to the columns in the cross point network. The rows in the cross point network are connected to the inputs D0-D7 of a preferential encoder PC and also connected through pull-down resistors R0-R7 to a zero level.

The outputs A2, B2 and C2 of the gate network G are connected to the inputs X1-X3 of a data switch DS having other inputs A, B and C also addressed from the counter C.

To the inputs X4-X6 of the data switch DS are connected the three outputs Q1, Q2 and Q3 from the preferential encoder PC.

The counter C obtains through the receiver in the telephone set clock information from the exchange unit CE (not shown on the drawing) which sends continuously towards each extension. The counter C produces on the outputs Q1, Q2 and Q3 the address signals on the one hand to the data switch DS and on the other hand to the decoder D through the gate network G.

The input X0 of the switch DS is connected to logical one level which corresponds to the level of the synchronization bit in the data word. The subsequent six data inputs X1–X6 are as previously mentioned connected to the gate netowrk G and to the preferential encoder PC. To the eighth input X7 of the switch three can be connected a signal which is independent of the state of the buttons and the hook. An inhibiting input Inh of the switch DS is controlled by the fourth bit from the output Q4 of the counter C.

Each of the circuits of FIG. 2 is known per se and does not separately constitute the invention. The code sender words in the following way:

With the hook contact K in the closed position a positive signal proceeds via the contact K and a diode Q9 to the input D7 of the preferential encoder PC. The input E of the gate network G receives a positive signal from K. From the outputs A2, B2 and C2 of the gate network logical zeros are therewith transmitted. The outputs Q1, Q2, Q3 of the preferential encoder PC transmits the binary combination which corresponds to the digit 7, i.e., 111. With the hook contact K closed a transmission of the word 0000000010001110 is thus forced. No other code can be transmitted as long as the hook contact is closed. When addressing the decoder D said decoder obtains a logical one on that one of its eight outputs which corresponds to the address in question. When no cross point in the matrix KP is closed, but the hook K is lifted all the signals on the inputs D0–D7 of the preferential encoder PC are zeros. When no button is pressed down the inputs D0–D7 obtain a constant low level through the resisotrs R0–R7. The signal of the output E of the encoder is in this case a one. The signals of the outputs of the gate network G towards the data switch DS are constituted by zeros and the outputs of the gate network towards the 1 of 8 decoder D follow the signals from the outputs of the counter C. Zero signals also proceed from the outputs of the encoder PC towards the data switch DS. The word which is transmitted on the line in this case has the form of eight zeros, one logical one and seven zeros0000000010000000. When closing one of the cross points in the matrix KP connection is obtained between one of the outputs of the decoder D and one of the inputs of the encoder PC and when the address on the inputs of the decoder agree with the encoder output, a logical one is transmitted to the input of the encoder. From the output E of the encoder now a zero proceeds, the outputs A2, B2 and C2 of the gate network G towards the data switch DS obtain the inverted address value, the outputs A1, B1 and C1 of the gate network towards the decoder D remain on the present address value because further changes on the output of the counter C are blocked through the gate network as long as the output E of the encoder transfer a zero signal to the input D of the gate network. From the outputs Q1–Q3 of the encoder simultaneously proceeds the binary combination which corresponds to the input which receives a logical one. In this way code words which correspond to the closed cross point are obtained on the inputs X1–X6 of the switch DS, where X1–X3 represents selected column and X4–X6 represent a selected row. If for example it is assumed that pressing down the button in the cross point Q3/D1 initiates a code which means a call to a certain telephone set the word will have the following form 0000000010011000.

The code words coming to the switch DS are supplied to the output Q in the following way:

The counter C addresses cyclically the inputs A, B and C of the data switch DS. The signal of the output Q4 from the counter C to the input Inh of the switch DS changes polarity for each eighth bit and thus, alternately is constituted of logical ones and zeros. When a logical one is received on the input Inh of the switch DS only zeros appear on the output Q of the switch. When a logical zero is received on the input I the inputs X0–X7 are addressed in turn whereby the information bits on such inputs are connected in turn to the output Q thus producing the outgoing code words. After eight further bits the input Inh again receives a one and only zeros are transmitted and so on. For obtaining synchronism in the transmitted messages, diphase modulation is utilized. The modulation is carried out by means of an EXCLUSIVE-OR circuit M one input of which obtains a clock signal of for example 62.5 kHz from the central unit CE via the receiver of the telephone, and the other input of which obtains the output signal from the switch DS.

The signal words from the different telephone sets are scanned periodically in the exchange unit CE and are detected in a code receiver KMM common for all the extensions (see FIG. 1). The detecting time for each extension corresponds to 3.5 signal words. The first 1.5 signal words can be lost as the scanning can begin in the middle of a word and the receiver needs a certain time to come into the right phase. The two following words are compared whether they are equal before they are accepted by the receiver. The probability of that a disturbed and for that reason faulty word should be accepted, is considerably reduced in this way.

Figure 3:
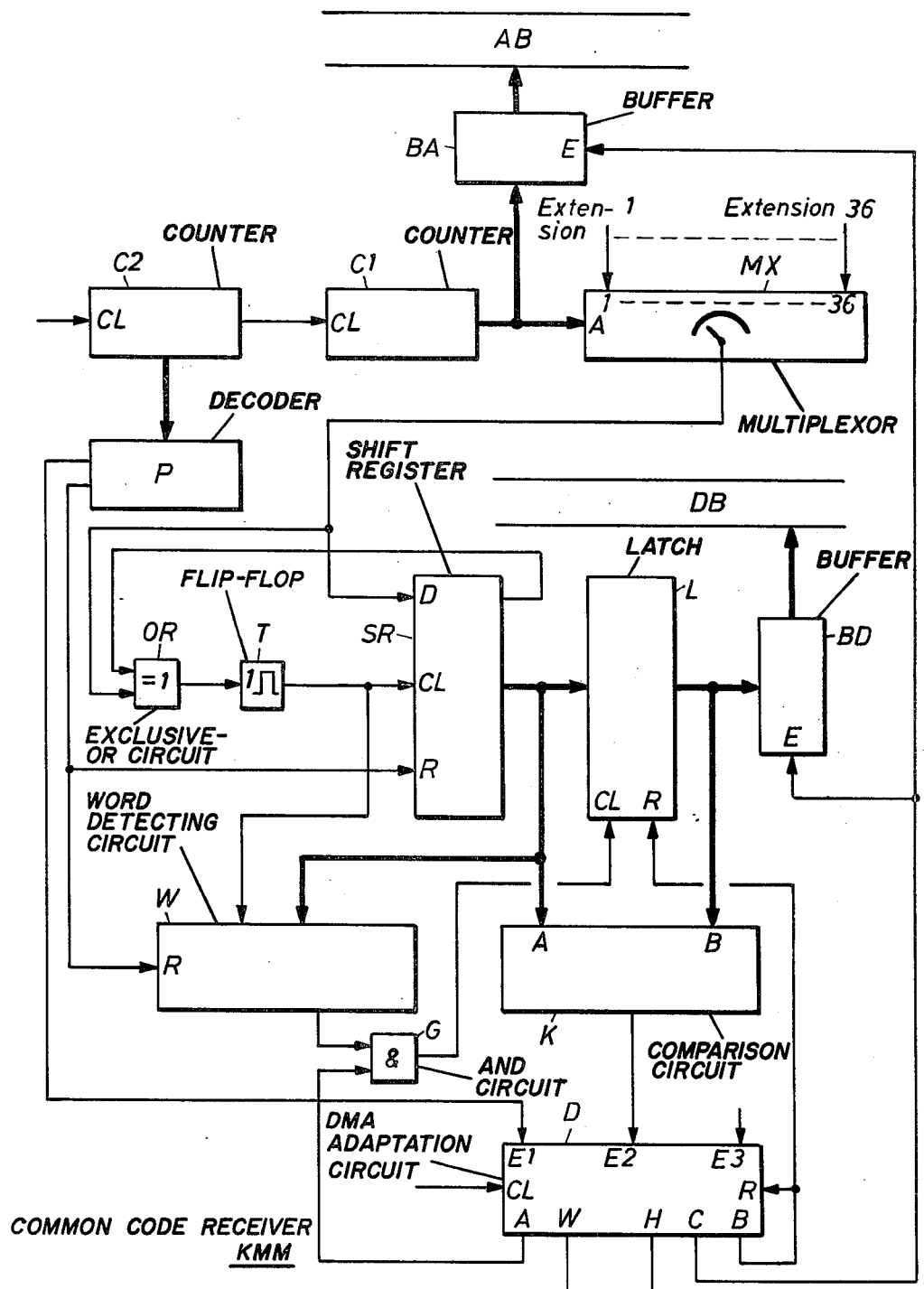
FIG. 3 is a block diagram of a code receiver common for all the sets and placed in the exchange unit of the system.

FIG. 3 shows a block diagram for the common code receiver KMM. It is assumed that to the system in the example has 36 extensions. The signals from the different extensions are connected to the inputs 1–36 of a multiplexor MX which also includes a scanning arrangement for periodical scanning the different inputs. The multiplexor MX is addressed by a 36-counter C1 which is stepped forward one step each time it receives a signal from a 56-counter C2. 56-counter C2 delivers an output signal each time it has counted 56 pulses of the frequency 62.5 kHz which corresponds to 3.5 code signal words. In this way information is obtained from each extension each 32.25th ms. By means of an EXCLUSIVE-OR circuit OR, a monostable stage T and the first flip-flop in a shift register SR the modulated signal from the multiplexor MX is demodulated.

The modulated signal from the multiplexor MX is supplied to one input of the EXCLUSIVE-OR circuit OR and the input to the first stage in the shift register SR. The output signal from the first stage in the shift register is supplied to the second input of the EXCLUSIVE-OR circuit OR.

The output of the EXCLUSIVE-OR circuit is connected to the input of the monostable flip-flop T which is triggered on positive flanks of the pulses from the EXCLUSUVE-OR circuit.

The output of the monostable flip-flop T is connected to a clock input of the shift register SR. The pulses from the monostable flip-flop T are of a certain determined duration (for example 12μs) independent of the signals from the EXCLUSIVE-OR circuit.

The output of the shift register SR which is connected to the input of the EXCLUSIVE-OR circuit obtains the same information which appears on the input to the shift register SR each time a positive flank occurs in the signals from the monostable flip-flop.

Figure 4:
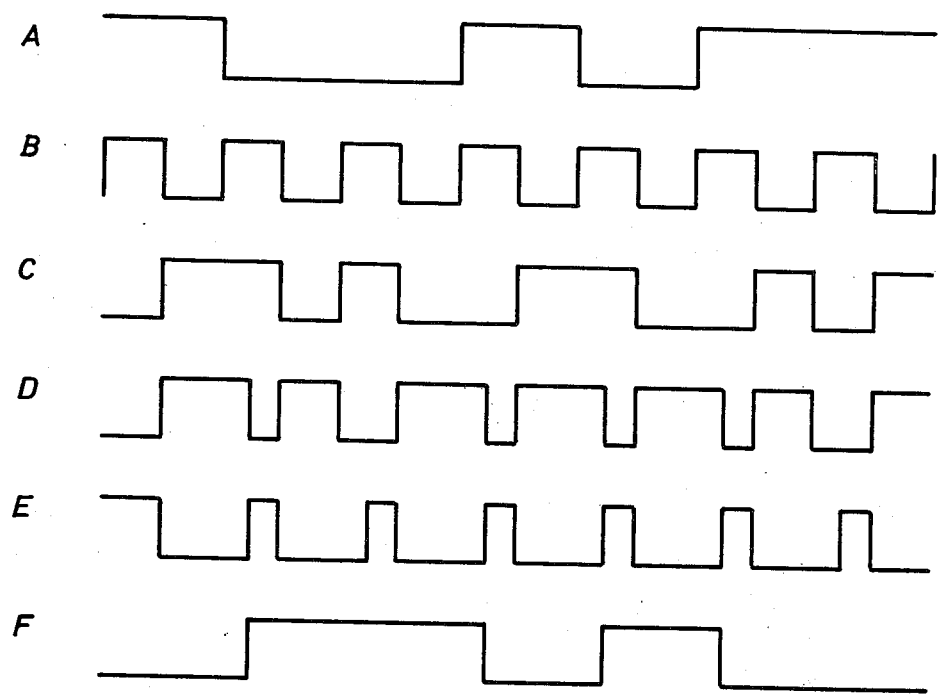
FIG. 4 shows the waveform of the signals when modulating and demodulating.

In FIG. 4 there is shown the waveform of the signals during modulating and demodulating. The signal A constitutes the data signal transmitted from the transmitting side before modulation. The signal B constitutes the clock signal for modulation of signal A in an EXCLUSIVE-OR circuit M (FIG. 2). Signal C constitutes the modulated signal which appears on the output of the EXCLUSIVE-OR circuit M of the transmitter side (FIG. 2). The modulated signal C is transmitted to the receiver in the exchange unit CE and is received on one of the inputs 1–36 in the multiplexor MX (FIG. 3). The signal C is also the output signal from the multiplexor MX. Signal D is the signal transmitted from the EXCLUSIVE-OR circuit OR by means of which the monostable flip-flop T is triggered. Signal E is the signal transmitted from the monostable flip-flop T and constitutes the clock signal for stepping forward data in the shift register SR. Signal F constitutes received data after demodulation and is also the signal which is fed from the output of the flip-flop 1 comprising the first stage of the shift register to one of the inputs of the EXCLUSIVE-OR circuit.

Assume a signal with the shape A. After modulation, signal C is obtained. Assume the shift register SR was reset. When the signal C to the EXCLUSIVE-OR circuit OR (FIG. 3) is a zero and the signal F to the circuit is a zero the signal D becomes also a zero. Nothing occurs in the monostable flip-flop which is controlled by the positive flanks. Having a one in signal C and still zero in signal F (as still no bit has been delivered from the shift register) a difference is obtained and the signal D goes positive (one). When signal D goes positive the monostable flip-flop T is triggered and emits a pulse E during a determined time (for example 12 $\mu$s). Signal C is in the one-position. When the monostable flip-flop after said time goes positive (signal E) the logical one of the signal C at the input of shift register SR is shifted to the output of the first stage flip-flop in the shift register SR (signal F). The EXCLUSIVE-OR circuit receives a one on each of the inputs and goes negative (zero). The signal C changes condition to zero on the input of the EXCLUSIVE-OR circuit, signal F is a one. Signal D goes positive again and triggers the monostable flip-flop which reverses and at its positive flank (signal E) shifts the content of the signal C, i.e., a logical one to the output of the first stage flip-flop in the shift register SR (signal F). In this way the demodulation of the signal C goes on and the result becomes a signal F which reproduces the original signal A but inverted. The inversion is intentional and is utilized for other purposes.

During the time the monostable flip-flop T is influenced, the signal D on the output of the EXCLUSIVE-OR-circuit can change its polarity in dependence of the polarity of the signals C and F. However, this does not influence the monostable flip-flop which is adjusted to transmit an unchangeable pulse for a determined time. Simultaneously with the demodulation, the signal is clocked forward through the eight bits shift register SR. The information at the outputs of the shift register is supplied to the inputs of a word detecting circuit W the task of which is to scan the words and generate a pulse on its output each time the synchronizing signal consisting of eight zeros and a one has been received. In the word detecting circuit there is a flip-flop which changes condition when 8 zeros from the shift register SR have been detected. The word detecting circuit now knows that eight zeros have been received. New information is fed into the shift register and the first logical one after the eight zeros, on the output of the shift register, influences the condition of a second flip-flop in the word detecting circuit W which then establishes that a one is also received. Now, the word detecting circuit produces an output signal. This signal is supplied to the clock signal input of an 8-bit latch L through an AND circuit G connected to the word detecting circuit whereby the data bits in the shift register SR are transmitted to the latch L and are stored therein. In a comparison circuit K the word written in the latch L is compared with the next word which is in the shift register SR. If the words are completely equal, i.e., full agreement exists, a signal is sent from the comparison circuit to a DMA-adaptation circuit D (Direct Memory Access) the task of which is to temporarily take over the work from the control unit MP which occurs for each telephone set signal which has been accepted by the signal word receiver. The control unit MP Is then insulated from the connected system bus, and the DMA-logic addresses the data memory and stores received signals. After this the control is returned to the control unit MP.

When the signal from the comparison circuit K has been received by the adaptation circuit D, i.e., when a correct word has been detected, its output A changes level and produces a signal which is fed to an input of the previously mentioned AND circuit G which thereby is blocked and prevents connection of a clock signal to the latch L so that further writing of signal words into the latch is stopped.

When the 56-counter C2 is reset after each completed stepping, the 36-counter C1 is stepped forward one step and addresses the next extension. Simultaneously the counter C2 influences a zero decoder P which produces a short pulse for resetting the shift register SR and the word detecting circuit W. Reception from the next extension can be started. The zero decoder P influences simultaneously the input E1 on the DMA-logic D the output H of which changes its level and supplies the control unit MP with a HALT signal (occasional stop). After a certain time (for example 2–13 $\mu$s) a DMA-answer is obtained from the control unit MP, i.e., confirmation that MP has interrupted its work. Then the DMA logic output C changes level and activates the buffer circuits BA and BD respectively which operates the address and data bus. The addressing of the data memory is carried out by means of the 6 bits of the 36-counter C1 and by means of 10 fixed programmed bits. Information to the data bus comes from the latch L. After 1 $\mu$s the DMA-output W is activated which gives a writing order to the data store. After further 1 $\mu$s the DMA-adaptation circuit D and the latch L are reset after which the control unit MP again starts the work with the system bus. This procedure is repeated for each extension.

If any extension is not connected or if disturbances appear on the line, the adaptation circuit D is not influenced by the comparison circuit K and then the signal from the zero decoder P results in direct resetting of the latch L without interruption in the work of the control unit.

In the exchange unit CE a code sender KSS common for all the telephone sets is included (see FIG. 1) the task of which is to transmit signal words to each connected telephone set for control of the indicator state and the tone ringer state. The combination of two bits in the signal word is used for bringing the tone ringer of the telephone set in a position which starts a ringing signal indicating an external call or in a position which starts a ringing signal indicating an internal call. The number of information bits in the signal word can vary between 4-32 depending on which type of telephone set is utilized. By dividing the information bits in several signal words following after each other it is possible to get a saving in the circuits used in the telephone set.

Figure 5:
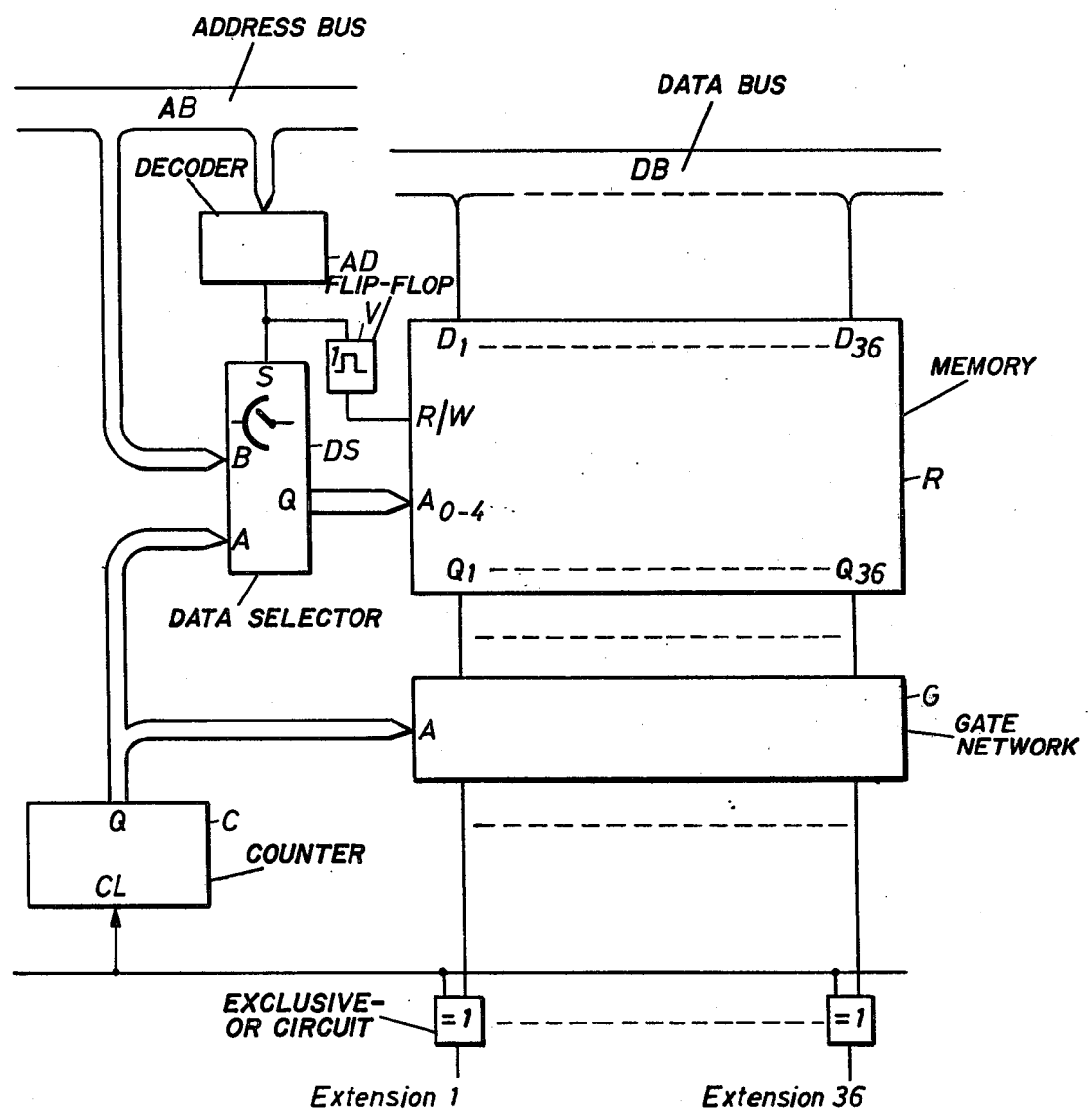
FIG. 5 is a block diagram of a code sender common for all the sets and placed in the exchange unit of the system.

In FIG. 5 a block diagram is shown of the code sender KSS. The information is transmitted to the respective telephone set in the form of signal words each comprising 16 bits. The word consists of eight zeros, one logical one for word synchronization, four information bits, one frame synchronization bit and one zero and a logical one for word synchronization, i.e., 000000001XXXXY01.

The frame synchronization bit is a zero in each eighth word, and a one in the other words.

The signal information for all extensions is stored in a RAM-memory R which is stepped forward by a counter C controlled by a clock signal supplied to the input CL of the counter C. To the outputs Q1-Q36 of the RAM memory a gate network G is connected, the task of which is to form the outgoing signal words. Each of the outputs 1-36 of the gate network is connected to one of the extension lines through an EXCLUSIVE-OR circuit which diphase modulate the output signal. Data to the RAM-memory is read from a data bus DB. The capacity of the RAM-memory is 32 words each including 36 bits.

A data selector DS has a first input S connected to an address decoder AD, a second input B is connected to an address bus AB and a third input A is connected to the counter C. The output Q of the data selector DS in connected to the inputs A0-A4 of the RAM memory R. When reading data from the memory the data selector DS is in such a position that the information from the address bus AB is disconnected. Via the data selector, the counter C then steps the memory R at a rate determined by the clock signal. The contents in the memory positions in question is transmitted in turn via the outputs 1-36 of the RAM memory, through the gate network G and out to the respective extension. The counter C steps continuously and after each cycle 1-32 a new cycle is started. In this way the signal sender KSS sends information continuously to all the extensions. When new data are to be written into the memory from the data bus DB the operation is as follows.

The address bus AB delivers signals to the address decoder AD. When the address of the device in question has been decoded a pulse is transmitted to the data selector DS, which disconnects the counter C and instead receives the address of the desired memory position from the address bus. The data selector forwards the address to the memory. Simultaneously the address decoder AD produces by means of a flip-flop V a writing pulse to the memory R, during this writing pulse, new data is read into the memory from the data bus DB. After the end of the writing of data into the memory and when no writing pulse appears, the data selector DS again connects the counter C to the memory, whereby the reading from the memory R towards the extensions again starts and is clocked by pulses from the counter C.

In each telephone set whch is connected to the system a code receiver KM is included for receiving the signal words transmitted from the sender in the exchange unit CE. The signals are received continuously in the code receiver.

Figure 6:
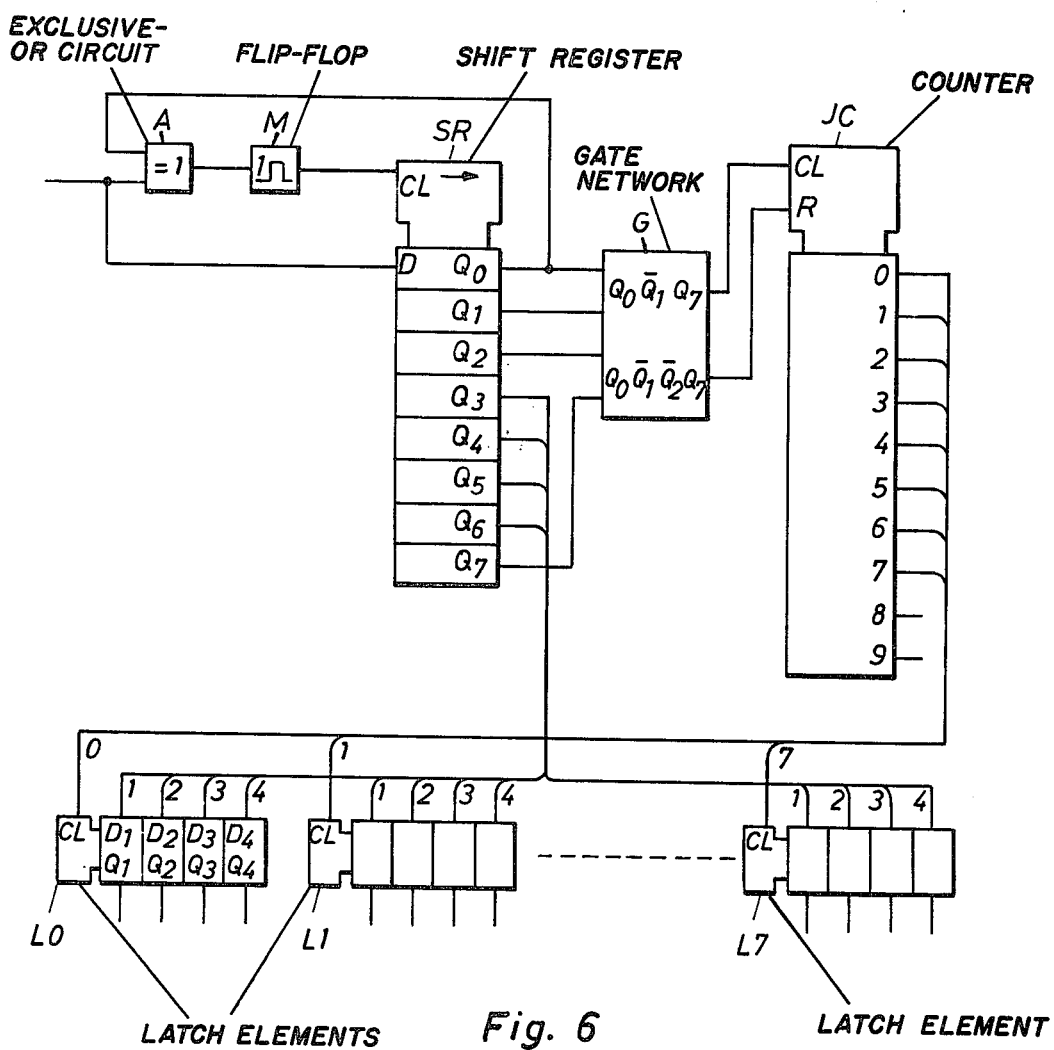
FIG. 6 is a block diagram of a code receiver included in each of the sets.

FIG. 6 shows a block diagram of the receiver KM. The incoming line signal is demodulated in a demodulator consisting of an EXCLUSIVE-OR circuit A, a monostable flip-flop M and the first flip-flop stage in a shift register SR. The demodulation principle has earlier been explained when describing the receiver in the exchange unit CE. A clock signal extracted from the incoming data flow is connected to input CL of the shift register SR. The demodulated signal is clocked forward in the eight bits long shift register under control of such clock signal. A received signal word is recognized by means of the three word synchronization bits included in the word. The composition of the word has earlier been explained when describing the sender in the exchange unit CE. Upon receiving a correct signal word, the word synchronization outputs Q0 and Q7 of the shift register produce logical ones and word synchronization output Q1 produces a logical zero. Actually the two bits Q0 and Q7 are sufficient for recognizing a word, but as the construction of the integrated circuits is such that an extra bit is obtained, this bit is also utilized for word synchronization. Thus, there is extra protection against detection of faulty signal words which can appear owing to disturbances.

The outputs Q0, Q1, Q2, and Q7 of the shift register SR are connected to a gate network G the task of which is upon recognizing a signal word to produce a signal for stepping of a 10-bit Johnsson counter JC.

The outputs Q3-Q6 of the shift register SR are connected to the inputs D1-D4 of eight latch elements L0-L7. Each latch has a clock signal input CL which is connected to one of the outputs 0-7 of the Johnsson counter JC.

When a correct signal word has been detected, the gate network G produces a clock signal to the input CL of the Johnsson counter, whereby this is activated and steps forward one step, and produces an output signal from the one of the outputs 0-7 which corresponds to the stepping. That latch whose clock signal input is connected to the output of the counter JC which was activated when stepping, reads the information bits of the word from the outputs Q3-Q6 of the shift register SR.

From the outputs of the latches L0-L7 signals are produced for influencing the tone ringers and light emitting diode indicators. For each 8th word the frame synchronization bit on the output Q2 of the shift register is a zero. A resetting pulse is then sent from the gate network G to the input R of the Johnsson counter. When the resetting pulse appears, the output O of the counter JC is activated and the information bits in the signal word in question are read into the latch No. 0.

The telephony parts of the multi-party telephone system are connected to a common system bus for exchanging address-, data- and control signals.

The system bus is controlled by the control unit MP which by means of an address bus selects the individual hardware in the telephony part (for example selector cross point, individual device or words in a signal transmitting memory). A data bus included in the system the transfers orders or fetches or delivers signal information from and to the control unit MP. The control unit also takes instructions from the program memory, reads or stores occasional information in the data memory and reads system dependent data in a switching field located in the system via the system bus. The control unit MP is in this case can by a micro processor of the type MOTOROLA MC 6800 with a capacity of 8 bits. By order of the control unit also the speech paths of the telephone sets are established in known way.

The function of the control unit MP with associated means is as described in for example the U.S. Pat. No. 3,492,446.

The selector VE (FIG. 1) has the task to connect by order of the control unit MP in a manner known per se the speech paths of the telephone sets for internal traffic between the telephone sets included in the system and for traffic between the telephone sets and the external lines connected to the system.

As previously mentioned the system includes a known signal converter SO which does not constitute the invention. The task of converter SO is under the control of the control unit MP to convert the signal words to impulse selection or tone selection signals towards a superior station for signalling to external subscribers and to convert external ringing signals to signal words for signalling within the system. The signal converter SO is placed in the exchange unit of the system.

The system is intended for the use with telephone sets of different types depending on the purpose of the whole system and depending on the task of the different telephone sets within the system, i.e., which types of services which are to be carried out by the different telephone sets. As an example, a telephone set of a first type can be mentioned which should have the possibility to give attendance service to all extensions within the system and possibly act as internal exchange for the system. A telephone set of a second type can on the other hand only reach one external line and cannot be used as attendance apparatus for other extensions in the system. A telephone set of the first mentioned type has therefore a larger number of button functions and indicators than a telephone set of said second type. Several telephone sets of said first type can be included in a system in order to for example control the traffic within different extension groups.

By means of a hybrid circuit in the system there is a possibility to utilize only one pair of wires for signalling in both directions between the telephone set and the central unit.

We claim:

1. In a multiparty telephone system having a plurality of telephone sets line pairs for speech signals, an external line for calls outside the multiparty telephone system and a central unit, apparatus for transmitting control indicia between the telephone sets and the central unit as digital signal words, said apparatus comprising:

(1) a line system for conveying digital signal words between the telephone sets and the central unit, said line system including a set of wires connected from each of the telephone sets to the central unit;

(2) a code sender means in each of the telephone sets for transmitting the same digital signal word at least twice via its associated set of wires to the central unit;

(3) a common code receiver means in the central unit for receiving the digital signal words from the telephone sets, said code receiver comprising a scanner means for continuously sequentially scanning the set of wires from each of the telephone sets for a period of time to receive at least two successive digital signal words, comparison means for comparing two successive received digital signal words to give an indication when said two successive received digital words are the same;

(4) a common code sender comprising in the central unit (a) an addressed digital signal word memory means in the central unit having a plurality of multibit position storage units each associated with a different one of the telephone sets for storing digital signal words associated with the respective telephone sets;

(b) first addressing means responsive to said comparison means for selecting storage units to accept digital signal words;

(c) second addressing means for sequentially selecting the bit positions of all storage units to emit their contents onto the associated sets of wires connecting the central unit to the respective telephone sets; and (5) a code receiver in each of the telephone sets for receiving digital signal words on its set of wires connected to the central unit.

2. The apparatus of claim 1 further comprising in each telephone set means for transmitting the digital signal words diphase modulated and means in the common code receiver means for demodulating such diphase modulated digital signal words.

3. The apparatus of claim 1, further comprising in each telephone set connected to said line system means for providing word synchronization for received digital signal words from the bits of the incoming digital signal words.

* * * * *